Nov. 3, 1970          P. U. PUTSCH ET AL          3,537,749
                      HEADREST CONSTRUCTION
Filed Jan. 15, 1969                          7 Sheets-Sheet 1
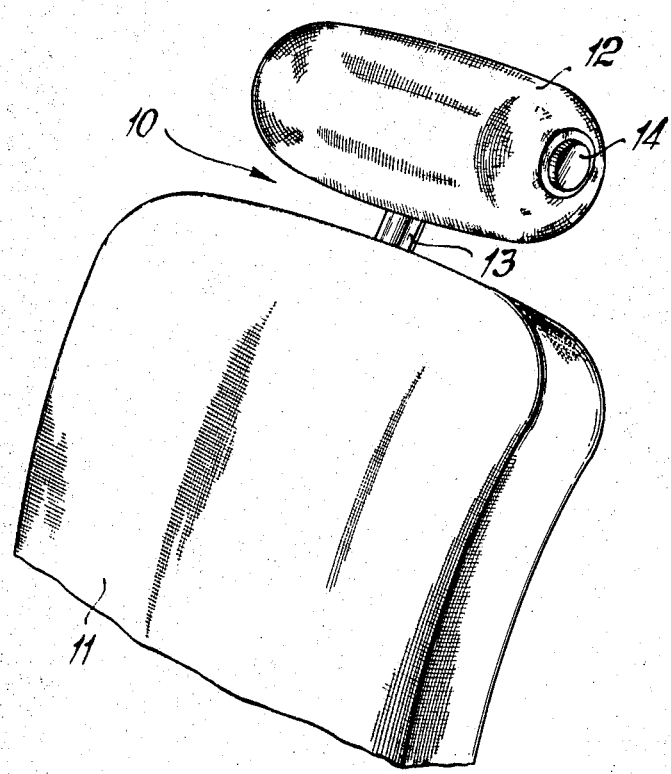
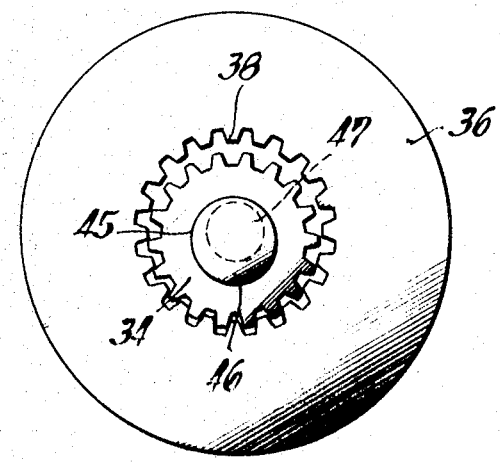
INVENTORS
PETER ULRICH PUTSCH
FRIEDRICH WILHELM PUTSCH
By Michael S. Striker
   Attorney

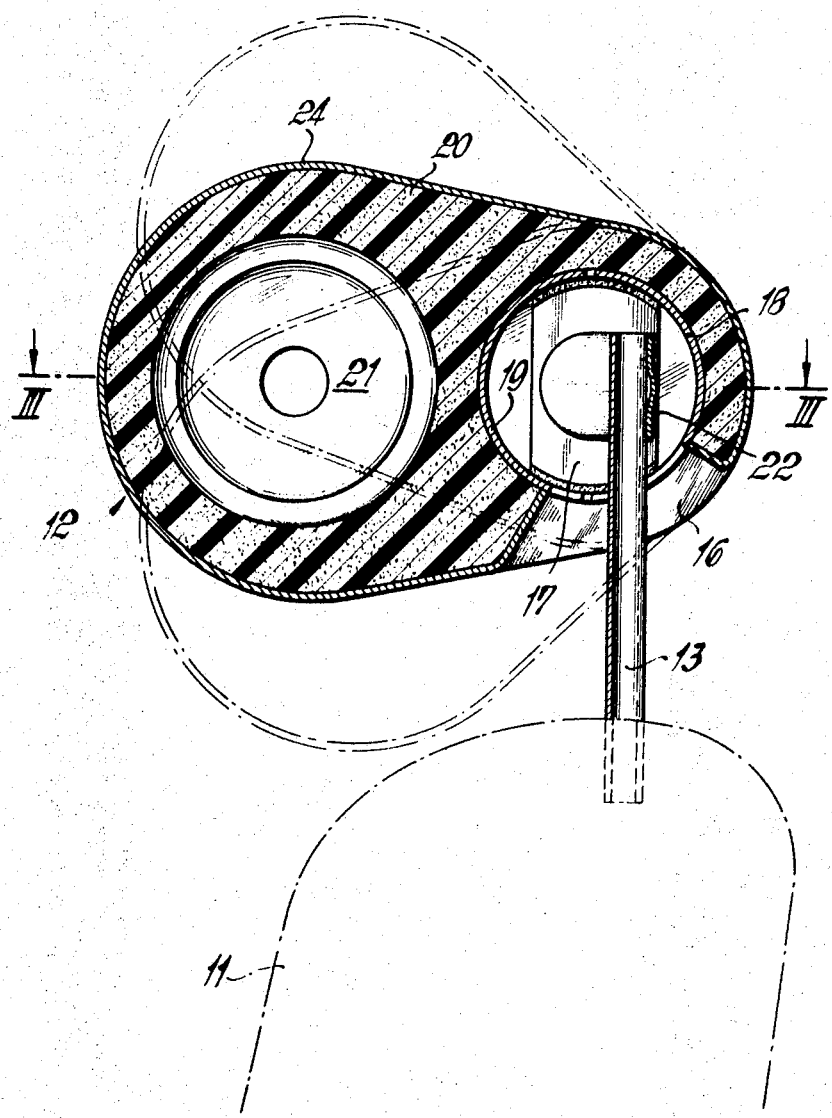

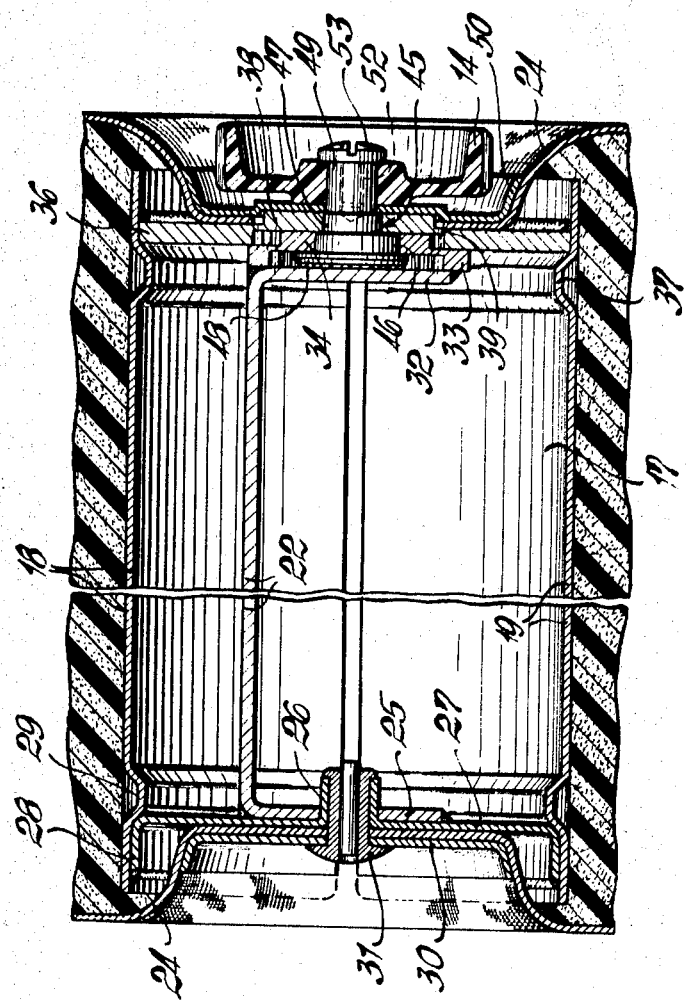

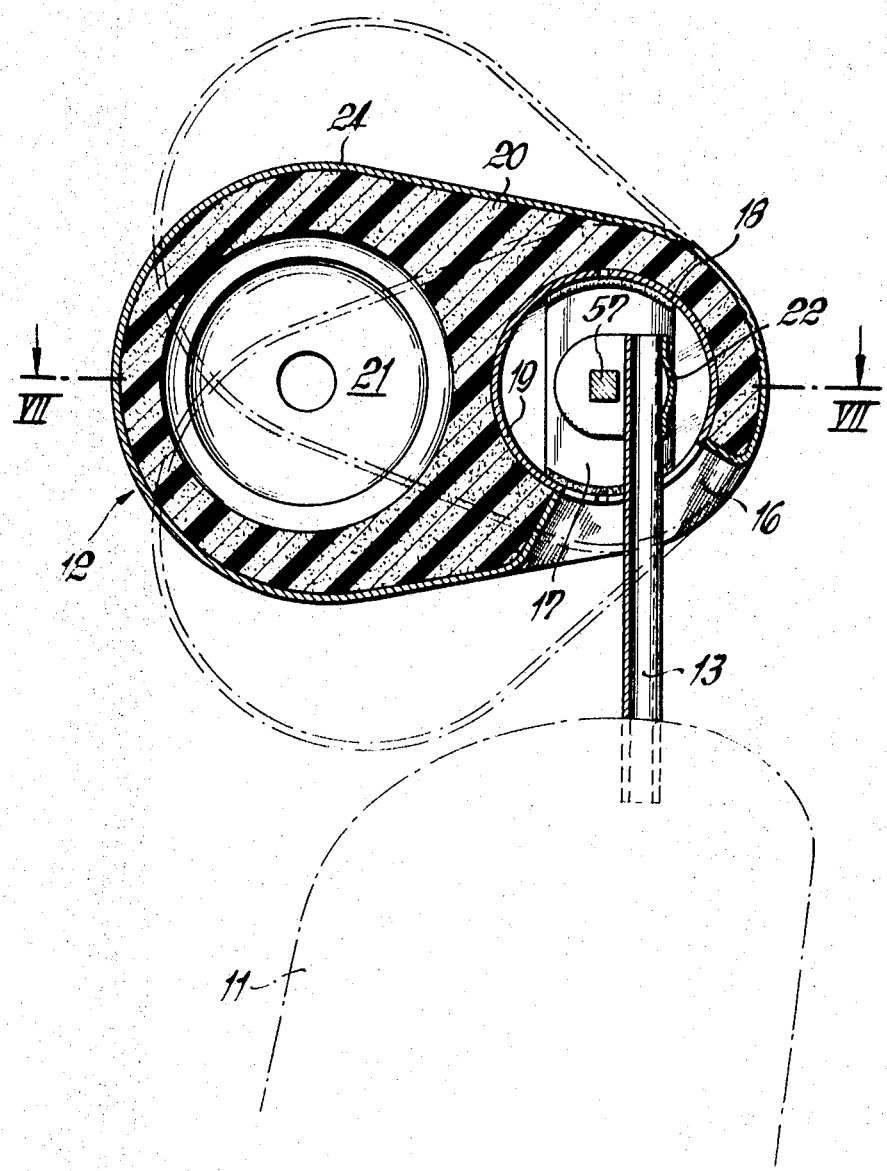

Nov. 3, 1970    P. U. PUTSCH ET AL    3,537,749
HEADREST CONSTRUCTION
Filed Jan. 15, 1969    7 Sheets-Sheet 6
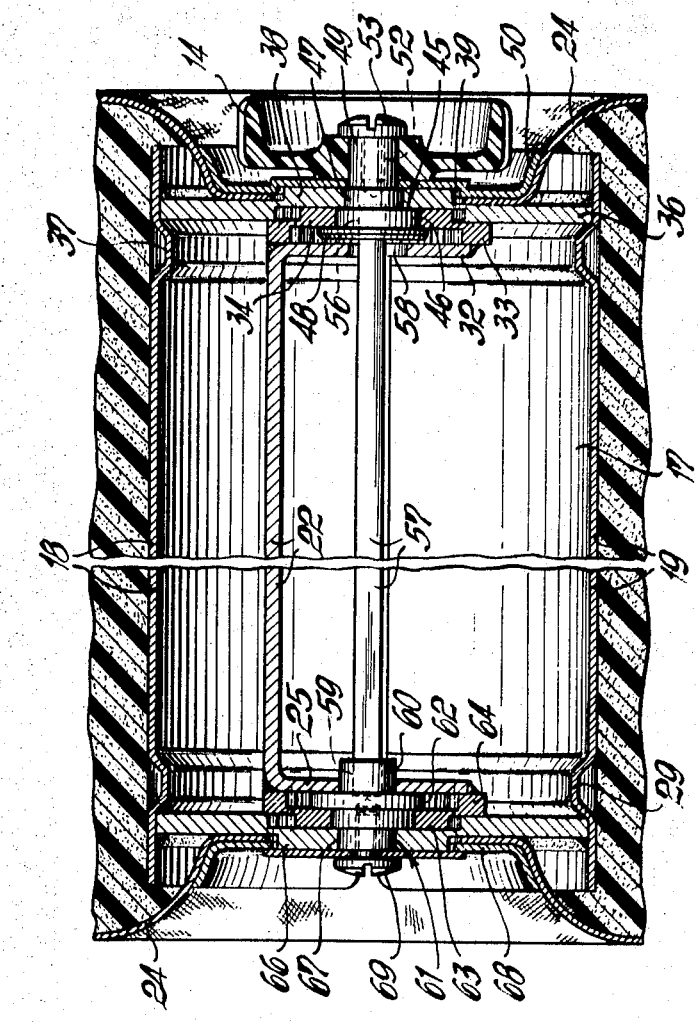
INVENTORS
PETER ULRICH PUTSCH
FRIEDRICH WILHELM PUTSCH
By: Michael S. Striker
Attorney

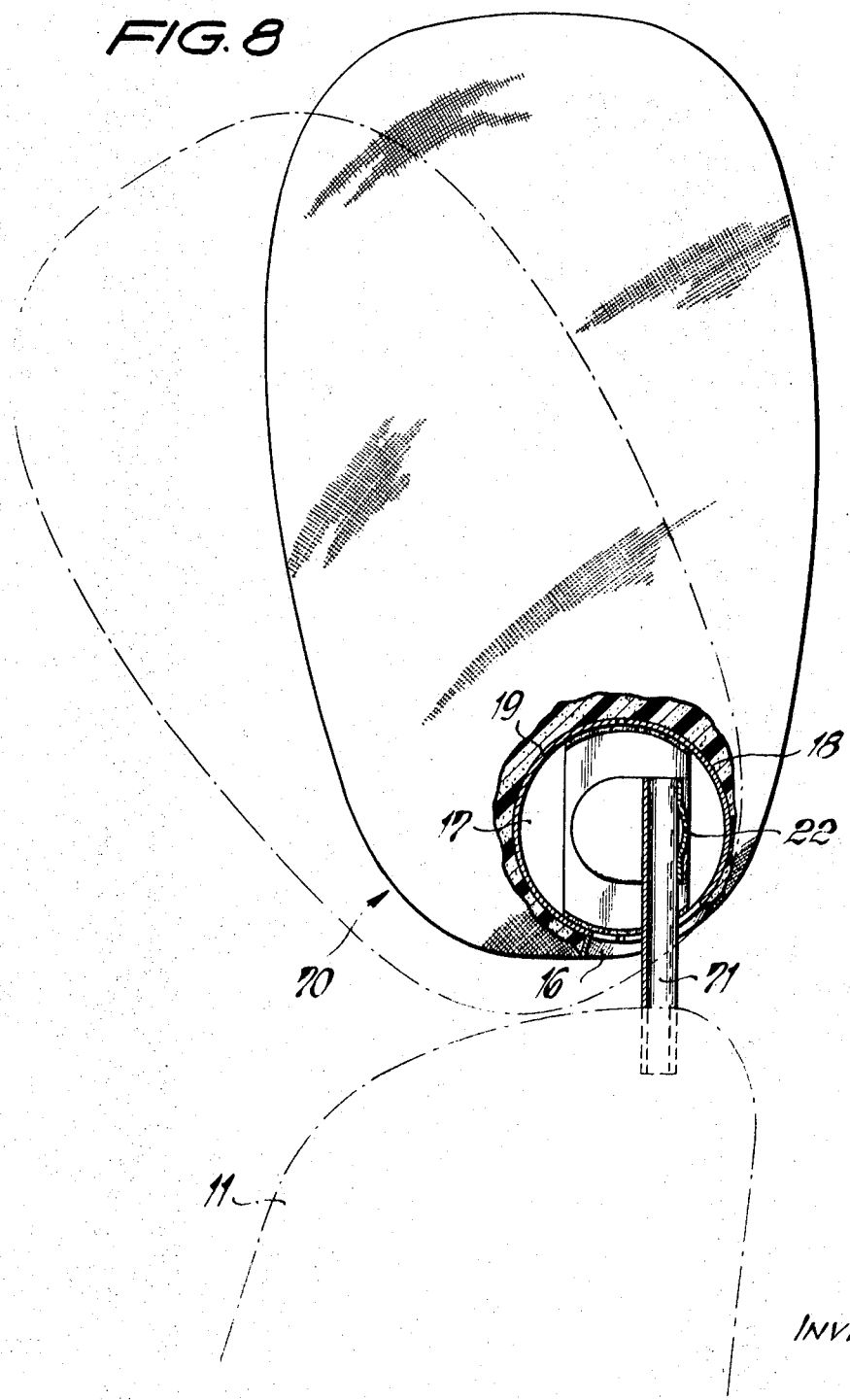

United States Patent Office 3,537,749
Patented Nov. 3, 1970

3,537,749
HEADREST CONSTRUCTION
Peter Ulrich Putsch, Mannweiler, Pfalz, and Friedrich Wilhelm Putsch, Remscheid, Germany, assignors to Fritz Keiper, Remscheid-Hasten, Germany
Filed Jan. 15, 1969, Ser. No. 791,295
Claims priority, application Germany, Jan. 20, 1968, K 64,508
Int. Cl. A47c 7/36
U.S. Cl. 297—408
17 Claims

ABSTRACT OF THE DISCLOSURE

A vehicle seat has a backrest having an upper edge and a headrest is arranged adjacent the upper edge of the backrest. Mounting means mounts the headrest on the backrest with freedom of angular adjustment relative thereto. The mounting means includes a pair of mounting elements each of which is associated with either the headrest or the backrest, a ring gear provided on one of the mounting elements and having inwardly directed teeth and a bridging portion extending across the inner free space of the ring gear, and a spur gear provided on the other of the mounting elements and received within the ring gear as to mesh with the teeth thereof. An eccentric extends through and is turnable with respect to both the gears and is so selected as to assure self-locking of the gears. Actuating means is provided for turning the eccentric with reference to the gears.

BACKGROUND OF THE INVENTION

The present invention is concerned with a headrest construction in general, and more particularly with the type of headrest provided on vehicle seats, particularly on seats of automotive vehicles.

It is known to provide the backrest of seats, especially in automotive vehicles, with headrests which are adjustable at the convenience and for the comfort of a person sitting in the seat.

One such construction known from the prior art provides for an arrangement wherein one mounting element is associated with the backrest and another mounting element is associated with the headrest, both constituting part of a mounting and adjusting arrangement whereby the headrest may be turned about a turning axis so as to be positioned in a desired relationship with reference to the backrest at the will of a user. The arrangement further comprises a ring gear and a spur gear extending into the ring gear portion and meshing with the inwardly directed teeth thereof. The outer diameter of the spur gear is smaller than the root diameter of the ring gear by a distance which corresponds at least to the height of one tooth and an eccentric is provided extending through both gears and turnable by means of an exteriorly accessible actuating portion, such as a knob, handle or the like. The eccentricity of the eccentric, on which latter one of two gears is mounted for rotation with the eccentric, corresponds substantially to the difference between the root diameter of the ring gear and the outer diameter of the spur gear. To change the angular position of the headrest with respect to the backrest, it is simply necessary to turn the actuating member which effects turning of the headrest about a predetermined axis and which, when turning of the actuating member is terminated, results in automatic locking of the headrest in the selected position without requiring additional arresting means. In this type of construction the various elements of the mounting and adjusting arrangement are substantially located within the confines of the body of the headrest, thus reducing or entirely precluding the possibility of injury to a passenger in a vehicle equipped with this type of arrangement.

While the arrangement just described has been found very satisfactory, it does suffer from the disadvantage that the mounting and adjusting arrangement is composed of a rather large number of components and requires the provision of separate bearings for the eccentric. The latter feature, in particular, is disadvantageous because not only must these bearings be separately manufactured, but the must also be assembled with the other components and as a result, the construction is relatively expensive.

It is, accordingly, an object of the present invention to improve the aforementioned construction and to avoid the disadvantages as just outlined.

A more particular object of the present invention is to improve the construction under question by reducing the number of constituent components required, eliminate the need for discrete bearings, and thereby reducing the manufacturing and assembling expense.

A further object of the invention is to make the space requirements for the arrangements under discussion as small as possible.

SUMMARY OF THE INVENTION

In pursuance of the above objects, and others which will become apparent herewith, one feature of my invention resides in providing, in a seat of any type but particularly of the type used in automotive vehicles, a backrest member having an upper edge, and a headrest member arranged adjacent the upper edge of the backrest member. Mounting means is associated with both members and mounts the headrest member on the backrest member turntable about an axis and with freedom of angular adjustment relative to the backrest member.

In accordance with my invention, the mounting means includes a pair of mounting elements each of which is associated with one of the members, a ring gear provided on one of the elements and having inwardly directed teeth, a spur gear provided on the other of the elements received within the ring gear and meshing with the teeth thereof, and an eccentric. More specifically, and in accordance with my invention, the ring gear is provided with a bridging portion which extends across the inner free space thereof and is provided with bearing means integral with the bridging portion.

The spur gear has an outer diameter which is smaller than the root diameter of the ring gear by a distance corresponding at least to the height of one tooth, and the eccentric extends through and is turnable with respect to both gears and includes one portion journalled in the bearing means and an eccentric portion whose eccentricity is substantially equal to the difference between the outer diameter and the root diameter and is so selected as to assure self-locking of the gears. Finally, actuating means is provided and so associated with the eccentric as to enable turning of the same with reference to the gears.

Advantageously, the ring gear will be located in a tubular cover element which is substantially concentric with the turning axis of the headrest member and in fact constitutes the supporting frame for the latter. Thus, turning movement of the ring gear can be directly transmitted to the headrest member. It is advantageous to construct the tubular cover of two shells of semi-circular cross-section whose inside abuts against the outside circumferential surface of the ring gear. This type of construction makes the manufacture of the cover member very simple but yet provides for a tightly closing cover member incoporating with it adequate space to accommodate the constituent components of the adjusting arrangement, space into which upholstery material used for upholstering the backrest member cannot intrude. Furthermore, the composition of the tubular cover of two shells makes it possible to assemble all constituent components of the device very readily.

Advantageously the spur gear is provided with an annular projecting portion encircling its circumference with which it is of one piece and this projecting portion should be offset laterally by approximately the depth of penetration of the spur gear into the ring gear. A mounting or supporting member for the headrest is non-rotatably connected with the spur gear via this projection. This makes it possible to construct the supporting member advantageously in form of a U-shaped member whose bight extends in parallelism with the axis of rotation of the headrest member. One arm of the U-shaped member is connected with the spur gear and the other arm is mounted turnable about the axis of rotation of the headrest member, the mounting being accomplished via a suitable pivot which is rigidly connected with the cover member. With this type of construction the proper positioning of the spur gear with respect to the ring gear is guaranteed. On the other hand, this construction makes it possible to select the length of the arms of the U-shaped members within the space encompassed by the cover member freely, because the arm associated with the spur gear is spaced from the ring gear as well as from the teeth on the spur gear. Finally, the alignment of the ring gear with respect to the U-shaped supporting member is considerably simplified in this manner.

The eccentric is advantageously provided with a flange or shoulder which is located between the spur gear and the associated arm of the U-shaped supporting member so that the eccentric is prevented from movement in undesired directions.

I may also provide the headrest member with an opening extending therethrough normal to the axis of rotation, and I may connect the headrest with the backrest member through an elongated carrier member which is preferably of channel shaped cross-section. In this case, the U-shaped supporting member will be reinforced in the region where it is connected with the carrier member. In this construction the minimum possible space requirements for the mounting arrangement are combined with adequate rigidity of the arrangement.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a somewhat diagrammatic perspective view of one embodiment of my invention;

FIG. 2 is a somewhat diagrammatic, partly sectioned view taken on the line II—II of FIG. 3;

FIG. 4 is an axially sectioned detailed view of the mounting and adjusting arrangement in the embodiment of FIGS. 1-3 shown in an enlarged scale;

FIG. 5 is a side-elevational view of a spur gear with meshing ring gear of the type used in the embodiment of FIGS. 1-4;

FIG. 6 is a view similar to FIG. 2 illustrating a further embodiment of the invention;

FIG. 7 is a section taken on the line VII—VII of FIG. 6; and

FIG. 8 is a view somewhat similar to FIG. 6, but considerably more diagrammatic and illustrating yet another embodiment of the invention.

DESCRIPTION OF THE PREFERRED EMBODIMENTS

Figure 3:
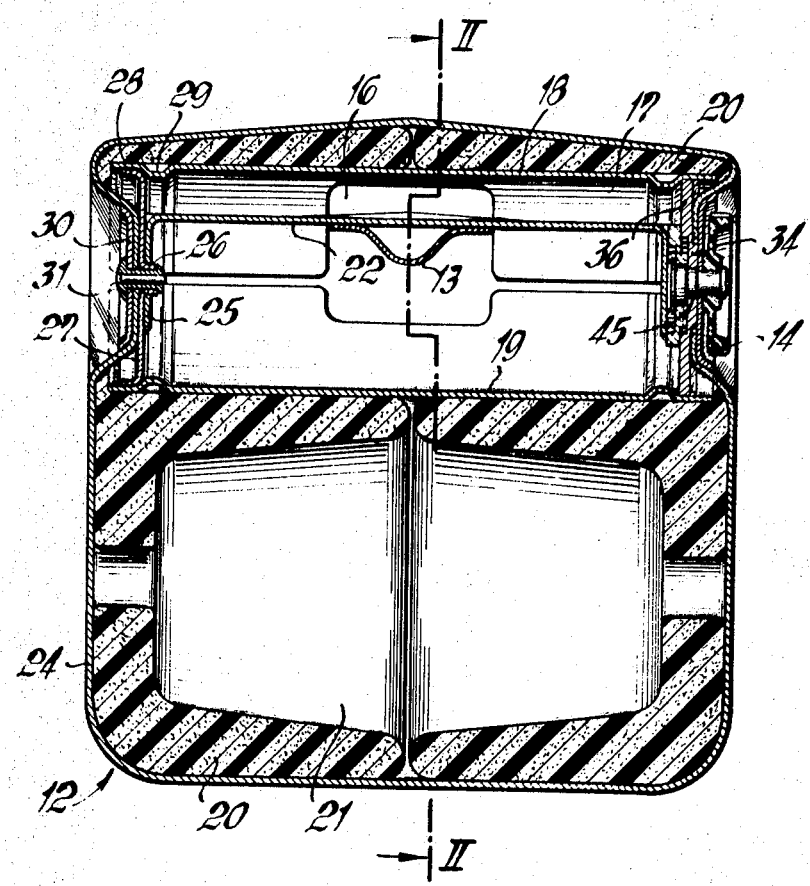
FIG. 3 is a section taken on the line III—III of FIG. 2.

Discussing firstly the embodiment illustrated in FIGS. 1-5, it is pointed out that in these figures, as well as in the remaining figures, only those components have been illustrated which are essential for an understanding of the invention. Other components known and not essential for the invention, have been omitted for the sake of clarity.

Thus, in FIG. 1 I have shown a vehicle seat 10 of which I have shown the upper portion of the backrest member 11, whereas the lower portion of the same, as well as the seat, have been omitted. A headrest member 12 is connected via a member 13 with the upper edge of the backrest member 11 and the headrest member 12 is of generally over cross-sectional configuration. The particular configuration of the headrest member 12 in cross section is most clearly evident in FIG. 2. However, cross-sectional configurations different from the ones shown are of course possible. The cross-sectional configuration shown herein assures that, if the accurate position of the headrest 12 with respect to the backrest member 11 is changed even slightly by actuating the actuating member, hereafter identified as the knob 14, of an adjusting and arresting device according to the present invention, a large variation in the available supporting area of the headrest member 12 will be accomplished.

As already pointed out, FIG. 2 is a section taken on the line II—II of FIG. 3, and the latter is a section taken on the line III—III of FIG. 2. It will be seen in FIG. 2 that the headrest member 12 is mounted on the elongated carrier member 13 which is advantageously of channel-shaped cross-section and which is connected to the backrest member 11 in any suitable manner well known to those skilled in the art. Evidently, the member 13 may be connected removably as well as non-removably with the backrest member 11.

In the illustrated embodiment, the headrest member 12 is provided substantially midway intermediate its opposite ends with an aperture or cutout 16 through which the upper end of the member 13 projects into the interior of the headrest member 12. More specifically, the upper end of the member 13 projects into a free space 17 extending in longitudinal direction of the headrest member 12 and outlined and surrounded by a cover consisting of two elongated shells 18 and 19 each of which is of substantially semi-circular cross-section in the illustrated embodiment. Together, these shells 18 and 19 constitute a tubular cover of cylindrical configuration which is embedded in and surrounded by the upholstery material of the headrest member 12. Evidently, any suitable type of upholstery material may be used, including foam rubber or the like. The upholstery material is identified with reference numeral 20.

In order to save on upholstery material as well as to make the headrest member 12 as soft as possible and therefore more comfortable, one side or part of the headrest member 12 consists of a two-section upholstery insert (compare FIG. 3) with each insert being of substantially cup-shaped configuration and with their open sides facing one another. This results in a hollow space 21 which is also shown in FIG. 2. A cover 24 of cloth or any other suitable material surrounds the upholstery material of the headrest member 12 and may be either removable or nonremovable as desired.

It will be appreciated from FIG. 2 that the opening 16 through which the member 13 projects into the interior of the headrest member 12, is provided not only in the upholstery material but also in the shells 18 and 19, or depending upon the particular positioning of these shells, in at least one of them. As shown particularly clearly in FIG. 3, a supporting member 22 of generally U-shaped configuration is connected with the upper end of the member 13 and is reinforced in the region where it is connected with the member 13.

FIG. 3 shows that the major dimension of the member 22, that is the bight of the U-shaped configuration, extends in parallelism with the turning axis about which the headrest member 12 turns, and that the member 22 is located within the space surrounded by the shells 18 and 19 which hereafter for the sake of convenience will be identified as the mounting space. One arm 25 of the member 22 is mounted on a bearing sleeve 26 of the bearing plate 27 which in turn abuts with its axially extending flanged part 28 (compare FIGS. 2 and 3) the inside of the shells 18 and 19 with which it is advantageously connected by welding. Inwardly adjacent the flanged part 28, the shells 18 and 19 are provided with an inwardly directed circumferential depression 29 against which the plate 28 abuts when the device is initially assembled, thus providing for proper and reliable positioning of the plate 28 prior to welding thereof to the shells 18 and 19.

The cover 24 surrounding the upholstery material of the headrest member 12 overlies the axially outwardly directed side of the plate 27 and is connected thereto by a cover plate 30. The drawing clearly shows that the upholstery material extends axially beyond the sharp edges of the shells 18 and 19, whereby the cover 24 is kept remote from these sharp edges where it is bent inwardly to be maintained in position against the plate 27. A rivet 31 or the like maintains the cover plate 30 and the bearing plate 27 connected.

As seen in FIG. 4, the upper arm 32 of the member 22 is connected with a projecting circumferentially extending flange 33 which is of one piece with the spur gear 34 shown in FIG. 4. The flange 33 projects from the spur gear 34 inwardly, as seen with respect to the mounting space, and is welded or otherwise suitably secured to the arm 32 of the member 22.

The spur gear 34 is located within the confines of a ring gear 36 having inwardly projecting teeth and being welded to the inside of the shells 18 and 19. Again, inwardly of these gears, the shells 18 and 19 are provided with inwardly projecting circumferentially extending depressions or grooves 37 corresponding to the ones identified with reference numeral 29 and discussed before. The purpose of these grooves 37 is the same as that of the grooves 29.

In accordance with my invention, the inner free space of the ring gear 36 is provided with a bridging portion 38 which is of one piece with the main body of the ring gear with which it is connected via an intermediate portion 39 integral with both, or more specifically of one piece with both. FIG. 4 clearly shows, although reference numerals not being separately applied, that the spur gear 34 and the bridging portion 38 of the ring gear 36 are both provided with centrally located apertures in which an eccentric member 45 is journalled for turning movement. These apertures thus constitute the bearing means for the eccentric member 45 and the need for separate bearings is eliminated.

The portion 46 of the eccentric member 45 which has the largest cross-sectional diameter, is journalled in the aperture provided in the spur gear 34 whereas the portion 47, which actually constitutes the eccentric portion of the eccentric member 45, is journalled in the aperture provided in the bridging portion 38. The portions 46 and 47 of the eccentric member 45 have their center axes eccentrically offset relative to one another.

A flange 48 is provided at the inner end of the eccentric member 45 and abuts against the inner side of the spur gear 34. At its other end, the eccentric member 45 is provided with an extension 49 of lesser diameter than the remainder of the member 45, and the extension 49 is concentric to the eccentric portion 47. An actuating member 14 is mounted on and secured to the extension 49.

A closure member 50 surrounds and abuts against the bridging portion 38 of the ring gear 36; it is prevented from rotation with respect to the bridging portion 38 by the fact that the outer circumference of the bridging portion 38 is provided with teeth. The cover 24 surrounding the upholstery material of the head rest member 12 is firmly clamped between the ring gear 36 and the closure member 50. The actuating member 14 is non-rotatably mounted on the extension 49, for instance by having a bore of non-circular cross-section through which the extension 49 extends with latter also being of non-circular cross-section, and a screw 53 is threaded into a tapped bore 52 provided in the extension 49, with the head of the screw overlying and abutting against the actuating member 14 to prevent the same from axial movement with reference to the extension 49.

As already indicated, the outer diameter of the spur gear 34 is smaller than the root diameter of the ring gear by a distance corresponding at least to the height of one tooth whereby I assure that some of the ring gear 36 will always be in mesh with the teeth of the spur gear 34. The number of teeth provided on the ring gear 36 differs from the number of teeth provided on the spur gear 34 by at least one and the eccentricity of the eccentric portion 47 of the eccentric member 45 with respect to the axis of rotation is so selected that self-locking action between the ring gear 36 and the spur gear 34 is assured.

As has already been stated, the ring gear 36 is provided with the bridging portion 38 with which it is of one piece. Again, the flange 33 is of one piece with the spur gear 34. Both of these gears are manufactured each in a single operation through a combination of stamping and pressing. Different materials may be used for the blanks from which these gears are manufactured, and it should be merely mentioned here that alloyed as well as un-alloyed steels may be employed whose tensile strength is between substantially 50 kg./mm.$^2$ and 65 kg./mm.$^2$. Un-alloyed steels may be of the type specified in German industrial norm DIM 1624 and alloyed steels may be of the type specified in German industrial norm DIM 17200. Particularly if alloyed steel is used, a prior normalizing of the material through heat treatment should be carried out to convert the graphite component of the material into globular graphite so as to improve the sliding characteristics of the metallic crystals.

The material of the blank is deformed in a press between a male and female mold. The material of the blank is located in the female mold and the male mold is pressed into the material of the blank. Both the female and male molds are provided on their outer and respective inner circumference with a configuration corresponding to the annulus of teeth which it is desired to provide on the ring gear or the spur gear, respectively.

Three steps are carried out in the manufacture of these gears. Initially, the material is placed into the female mold and engaged by a suitable device which holds it in position. In cooperation with a counter member or stop member associated with the male mold, the male mold thereupon subjects the material of the blank to an initial deformation resulting in an increase in the material concentration in the region of deformation. In the third step, the inner annulus of teeth in the ring gear is produced with simultaneous production of the bridging portion or, if the spur gear is being manufactured, the third step involves the shaping of the material into the form of the spur gear. The apertures provided in the bridging portion on the one hand and in the spur gear on the other hand, and in which the eccentric member 45 is journalled, can be produced simultaneously.

Operation of the arrangement according to the present invention will be obvious from what has been set forth until now. To change the angular position of the headrest member 12 with respect to the backrest member 11, the actuating member 14, whose configuration may of course be different from that shown by way of example in the drawing, is turned. This results in turning of the eccentric member 45 about the central axis of the spur gear 34 which is rigidly connected with the supporting member 22. The eccentric portion 47 of the member 45 serves to move the ring gear 34 in an eccentric path whereby the teeth of the ring gear roll in an eccentric path on the teeth of the spur gear 34. Because the ring gear 36 is connected with the shells 18 and 19 against rotation relative to the same, the headrest member 12 is turned in correspondence with the turning of the ring gear 36. As a result of the eccentric arrangement of the center portion 47 with respect to the axis of rotation of the eccentric member 45, the gears 34 and 36 will always be subjected to a self-locking action, so that the headrest member 12 will be automatically locked in any position of the ring gear 36 when continued turning of the actuating member 14 ceases. The extent to which the headrest member 12 may be turned about the axis depends exclusively upon the circumferential length of the opening 16 provided in the headrest member and the shells 18 and/or 19.

A further embodiment of the invention is illustrated in FIGS. 6 and 7. Whereas in the embodiment of FIGS. 1–5 only a single adjusting device was utilized at one end of the headrest member 12, the embodiment of FIGS. 6 and 7 provides two such devices which are coupled with one another so that they can be simultaneously actuated by a single actuating member 15 (compare FIG. 7). Identical reference numerals identify identical components.

Basically, the construction of the device in FIGS. 6 and 7 are the same as that shown in FIGS. 1–5. However, in FIGS. 6 and 7 that portion 46 of the eccentric member 45 which is provided with the flange 48, here has a blind bore 56 in which the end portion of coupling shaft 57 is received non-rotatably, for instance for configurating the end portion as well as the cross section of the blind bore 56 of other-than-circular outline. The drawing shows (compare FIG. 7) that the coupling shaft 57 extends through an opening provided in the arm 32 of the supporting member 22. The opposite end portion of the coupling shaft 57 is also of other-than-circular cross section and extends non-rotatably into a corresponding blind bore 59 and provided in a projection 60 as constitutes an extension of a second eccentric member 61, which extension projects through an opening in the arm 25 of the supporting member 22.

This additional eccentric member 61 is provided with a flange 62 located between the arm 25 and a further spur gear 63 which, as in the device at the right-hand side in FIG. 1, also is provided with a circumferential flange 64 rigidly connected with the arm 25 of the supporting member 22. An additional ring gear 65 is provided which meshes with the spur gear 63 and has a bridging portion 66 which is of one piece with the ring gear 65 and provided with an opening constituting a bearing for the eccentric portion 67 of the eccentric member 61. Also as in the device at the right-hand side of FIG. 7, a second closure 68 is mounted on the bridging portion 66 and is prevented from axial movement by the presence of a screw 69 converted into a tapped bore in the eccentric member 61. The closure member 68 also serves for holding the cover 24 of the headrest member 12, just as in the embodiment of FIGS. 1–5.

In the embodiment of FIGS. 6 and 7, the rotation of the actuating member 14 transmits the turning movement thereby imparted to the eccentric member 45 to the second eccentric member 61 via the intermediary of the coupling shaft 57. Thus, turning of the actuating member 14 results in simultaneous movement of the ring gears 36 and 65 and in angular adjustment of the headrest member 12 with respect to the backrest member 11. In this embodiment it is necessary to prevent a movement of the headrest member 12 in a sense resulting in an inclination of the longitudinal extension thereof with respect to the turning axis which could result from the eccentric movement of both of the ring gears which is transmitted to the headrest member 12. This is accomplished by symmetrically installing the eccentric members 45 and 61.

Coming, finally, to the embodiment illustrated in FIG. 8, it will be seen that this embodiment differs from the preceding ones in that the cross section of the headrest member 70 is larger than that of the headrest member 12 in the preceding embodiments. The adjusting and locking device, however, corresponds to the one illustrated in FIGS. 1–5. The member 13 connected the headrest member 12 and backrest member 11 in FIGS. 1–5 is in FIG. 8 replaced with a member 71 and in this embodiment may be shorter than the member 13 because of the different positioning of the shells 18 and 19 in the headrest member 70. It goes without saying, of course, that in the embodiment of FIG. 8 it is also possible to utilize two adjusting and arresting devices as illustrated in FIGS. 6 and 7.

Evidently, the cross-sectional configuration of the headrest member may be different from what has been illustrated, for instance it may be circular in which case it is however necessary to assure that its turning axis will not coincide with its central axis. In place of the member 13 (or 71 in FIG. 8) other members of different configuration can also be provided, just as such members may be provided at the opposite axial ends of the headrest member rather than as substantially midway therebetween. In this case it is of course not necessary to provide the headrest member and the shells 18, 19 with the openings shown in the drawing. Also, the adjusting and locking device may be reversed in its assembly in that the ring gear may be connected with the member 22 whereas the spur gear may be connected with the headrest member directly. It is evidently also possible to provide suitable means—already well known in the art—for adjusting the distance between the headrest member and the other edge of the backrest member.

It will be understood that each of the elements described above, or two or more together, may also find a useful application in other types of constructions differing from the types described above.

While the invention has been illustrated and described as embodied in a headrest construction particularly suitable for use in seats of automotive vehicles, it is not intended to be limited to the details shown, since various modifications and structural changes may be made without departing in any way from the spirit of the present invention.

What is claimed as new and resired to be protected by Letters Patent is set forth in the appended claims:

1. In a seat, particularly for automotive vehicles, a combination comprising a backrest member having an upper edge; a headrest member arranged adjacent said upper edge of said backrest member; mounting means associated with said members mounting said headrest member on said backrest member turnable about an axis and with freedom of angular adjustment relative to said backrest member, said mounting means including a pair of mounting elements each associated with one of said members, a ring gear provided on one of said elements and having inwardly directed teeth and a bridging portion extending across the inner free space of said ring gear, a spur gear provided on the other of said elements received within said ring gear and meshing with said teeth thereof, said spur gear having an outer diameter which is smaller than the root diameter of said ring gear by a distance corresponding at least to the height of one tooth, bearing means provided in and integral with said bridging portion, and eccentric means extending through and turnable with respect to both of said gears and including one portion journalled in said bearing means and an eccentric other portion whose eccentricity is substantially equal to the difference between said outer diameter and said root diameter and is so selected as to assure self-locking of said gears; and actuating means operatively associated with said eccentric means for enabling turning of the same with reference to said gears.

2. In a seat as defined in claim 1, said mounting means comprising tubular cover means substantially concentric with said axis, and said gears being received within the confines of said tubular cover means.

3. In a seat as defined in claim 2, said tubular cover means comprising two connected shells of semi-circular cross-section, said shells having inner sides surrounding and in contact with an outer circumferential edge face of said ring gear.

4. In a seat as defined in claim 2, said mounting means comprising support means carrying said headrest member turnable about said axis, and said spur gear being rigid and turnable with said support means.

5. In a seat as defined in claim 4, said support means comprising a support member of substantially U-shaped outline paralleling said axis and having opposite arms spaced from one another in longitudinal direction of said axis, said spur gear being rigid with one of said arms; and further comprising journal means rigid with said cover means and journalling the other of said arms for turning movement about said axis.

6. In a seat as defined in claim 5, said spur gear comprising an annular circumferential portion integral therewith and surrounding the outer circumference thereof, said annular circumferential portion being offset and projecting from one axial side of said spur gear by a distance substantially corresponding to the depth of penetration of said spur gear into said ring gear, and said annular circumferential portion being rigid with said one arm with said one axial side and said one arm together defining a clearance.

7. In a seat as defined in claim 6, said eccentric means comprising a bolt provided with said one portion and said eccentric other portion; and said bolt further comprising a flange located in said clearance and preventing undesired removal of said bolt.

8. In a seat as defined in claim 5, said cover means, gears and support member being located within said headrest member, and the latter being provided with an opening intersecting said axis and communicating with said support member; and an elongated carrier member having one end portion connected with said backrest member and another end portion extending into said opening and connected with said support member.

9. In a seat as defined in claim 8, wherein said carrier member is of substantially channel-shaped cross-section.

10. In a seat as defined in claim 8; and further comprising reinforcing means reinforcing said support member in the region where the latter is connected with said carrier member.

11. In a seat as defined in claim 5, said tubular cover means having opposite open ends, and said gears and said journal means respectively closing said opposite open ends of said tubular cover means.

12. In a seat as defined in claim 11, said journal means including a journal plate, and said tubular cover means being provided inwardly adjacent said open ends thereof with inwardly projecting abutments for said ring gear and said journal plate, respectively.

13. In a seat as defined in claim 11, said abutments being inwardly projecting circumferentially extending annular shoulders.

14. In a seat as defined in claim 12, said tubular cover plate being located within said headrest member; further comprising a covering sheath for said headrest member; and engagement members respectively associated with said journal plate and said ring gear and engaging said covering sheath for maintaining the same in place.

15. In a seat as defined in claim 12, said bridging portion projecting axially beyond said ring gear and having an annular radially directed edge face provided with teeth; the engagement member associated with said ring gear having an aperture dimensioned so as to meshingly and non-rotatably receive said edge face therein.

16. In a seat as defined in claim 12, said journal means including a journal element of one piece with said journal plate.

17. In a seat as defined in claim 1, said mounting means being arranged at and operatively associated with one axial portion of said headrest member; further comprising additional mounting means similar to the first-mentioned mounting means and arranged at and operatively associated with the other axial end portion of said headrest member; and further comprising coupling means coupling the respective eccentric means for turning movement in unison in response to actuation of said actuating means.

References Cited

UNITED STATES PATENTS

| | | | |
|---|---|---|---|
| 1,505,474 | 8/1924 | Laraia | 297—408 |
| 1,560,065 | 11/1925 | Laraia | 297—408 |
| 2,917,109 | 12/1959 | Marsh | 297—408 |
| 3,307,874 | 4/1967 | Wilson | 297—408 |

REINALDO P. MACHADO, Primary Examiner